(12) United States Patent
Scharp et al.

(10) Patent No.: US 6,487,773 B2
(45) Date of Patent: Dec. 3, 2002

(54) METHOD OF MAKING ONE-PIECE PISTON

(75) Inventors: Rainer Scharp, Farmington Hills, MI (US); Jochen Ernst Danner, Royal Oak, MI (US)

(73) Assignee: Mahle GmbH, Stuttgart (DE)

( * ) Notice: Subject to any disclaimer, the term of this patent is extended or adjusted under 35 U.S.C. 154(b) by 7 days.

(21) Appl. No.: 09/816,026

(22) Filed: Mar. 23, 2001

(65) Prior Publication Data

US 2002/0133946 A1 Sep. 26, 2002

(51) Int. Cl.[7] ................................................. B23P 15/00
(52) U.S. Cl. .............................. 29/888.04; 29/888.042; 29/888.049; 29/557
(58) Field of Search ....................... 29/888.049, 888.04, 29/888.042, 557, 558; 123/193.4, 193.6; 92/186

(56) References Cited

U.S. PATENT DOCUMENTS

| | | | |
|---|---|---|---|
| 3,654,840 A | * 4/1972 | Elliott | 29/888.05 |
| 4,125,926 A | * 11/1978 | Gale et al. | 219/121.63 |
| 4,364,159 A | * 12/1982 | Holcombe | 123/193.6 |
| 4,365,399 A | * 12/1982 | Mahrus | 164/108 |
| 4,463,590 A | * 8/1984 | Theobald | 29/898.048 |
| 4,608,947 A | 9/1986 | Stadler | |
| 4,847,964 A | * 7/1989 | Yarnell | 405/156 |
| 4,887,449 A | * 12/1989 | Kanai et al. | 29/888.04 |
| 5,150,517 A | * 9/1992 | Martins Leites et al. | 29/888.04 |
| 5,230,148 A | * 7/1993 | Martins Leites et al. | 29/888.42 |
| 5,778,533 A | * 7/1998 | Kemnitz | 123/193.6 |
| 5,992,015 A | * 11/1999 | Kurita et al. | 29/888.042 |
| 6,070,323 A | * 6/2000 | Koike et al. | 29/888.04 |
| 6,363,608 B1 | * 4/2002 | Koike et al. | 29/888.04 |

FOREIGN PATENT DOCUMENTS

DE    36 43 039    6/1988

* cited by examiner

Primary Examiner—I. Cuda-Rosenbaum
(74) Attorney, Agent, or Firm—Collard & Roe, P.C.

(57) ABSTRACT

The invention concerns a method of producing a one-part piston which, in the region of the piston ring zone, has a closed cooling duct and a recess between the piston ring zone and the box-shaped piston body. The method comprises the following steps: A piston blank is produced by a forging process and the annular recess is produced by machining so that an upper part of the piston skirt remains connected to a radially inner region below the piston crown. The axial height of the recess corresponds at least to the axial height of the cooling duct. The cooling duct, which is open at the bottom, is produced by machining and hub bores are formed and the outer contour of the piston is finished. The cooling duct, which is open at the bottom, is closed by a two-part cover ring.

8 Claims, 2 Drawing Sheets

METHOD OF MAKING ONE-PIECE PISTON

BACKGROUND OF THE INVENTION

1. Field of the Invention

The invention relates to a method of producing a one-piece piston having a cooling duct.

2. The Prior Art

Such a piston, which is manufactured from steel by casting, is known from practical operation. To obtain a closed cooling duct, releasable casting cores have to be used, which complicate the production process and make it expensive.

A one-piece cooling duct piston is also known from U.S. Pat. No. 4,608,947. However, this reference does not teach anything regarding the method of producing such a piston.

SUMMARY OF THE INVENTION

The present invention deals with the problem of producing a one-piece piston having a closed cooling duct in a constructionally simple way.

This problem is solved with a method for producing a one-piece piston having a closed cooling duct annularly extending in the piston crown at the level of the piston ring band, and an annular recess between the piston ring band and the box-shaped piston skirt. The piston skirt is connected with the piston bosses suspended on the piston crown and to a radially inner region below the crown. The method comprises forging a piston blank, machining an annular recess between the piston ring band and the box-shaped piston skirt, with the depth of the recess being machined so that the upper end of the skirt remains connected to the radially inner region below the crown, machining a downwardly-open cooling duct, producing boss bores and finishing the outer contour of the piston, and closing the downwardly-open cooling duct with a cover ring.

In regard to the state of the art, the design of a jointed piston (articulated piston) needs to be mentioned as well, where the crown of the piston is connected with the piston pin separately from the piston skirt only via the pin (see, for example, DE-OS 36 43 039). With such a jointed piston, there is a cooling duct in the crown of the piston that is open at the bottom, such duct being closed with a divided sheet metal ring. The manufacture of such a cooling duct is possible only by dividing the piston in two parts, which, however, leads to increased expenditure in the manufacture of the jointed piston because the piston skirt has to be additionally machined separately. In addition, as compared to the one-piece piston according to the invention, such a jointed piston requires a longer piston pin, which increases the weight.

A method of producing a one-part cooling duct piston is disclosed in U.S. Pat. No. 5,778,533, the disclosure of which is incorporated by reference. The present invention improves on this patent by machining the annular recess so that the upper end of the piston skirt remains connected to the radially inner region below the crown. The connection can extend all around, or could be strut-like and only be in selected locations.

The present invention is an improvement over the previous one-piece piston because it is a stronger design and has correspondingly higher safety margins in highly stressed areas. In addition, the piston secondary motion is reduced because of the stiffer design, which results in less ring motion, which reduces wear and lessens oil requirements, and has a reduced risk of cavitation. Furthermore, the improved design makes the distribution of side load more even, contributing to less cylinder liner wear. Finally, the piston of the present invention is easier to machine. It allows for a turning operation with fewer interruptions, and requires no deburring action. In certain cases, the stiffness of the skirt is sufficient to guide the piston only in the skirt section. Guidance in the ring band area could be eliminated, if desired.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
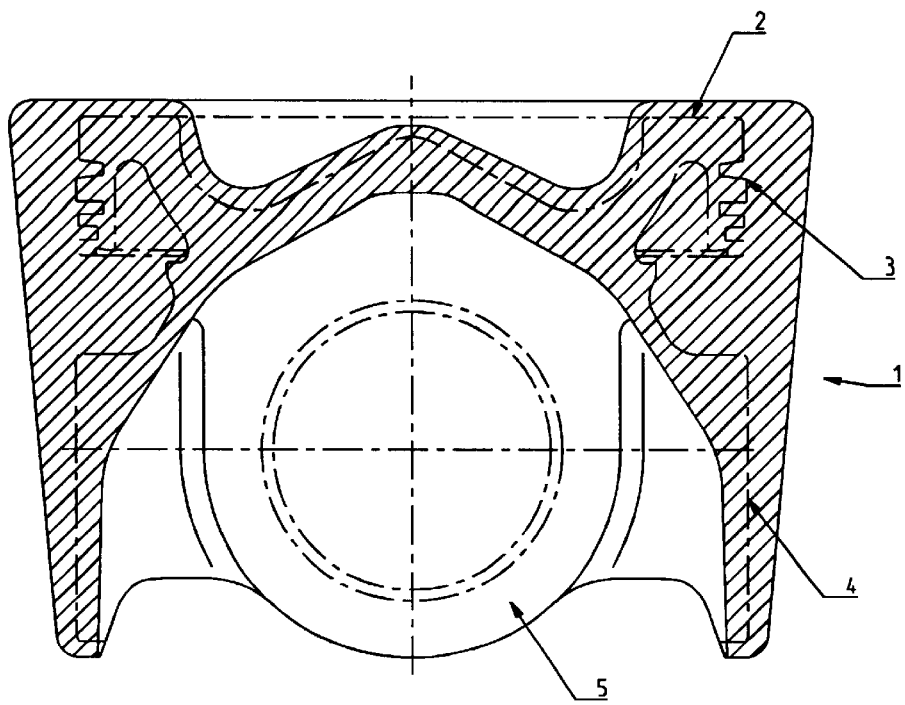
FIG. 1 shows a lateral, partly sectional view of a piston blank according to the invention.
Figure 2:
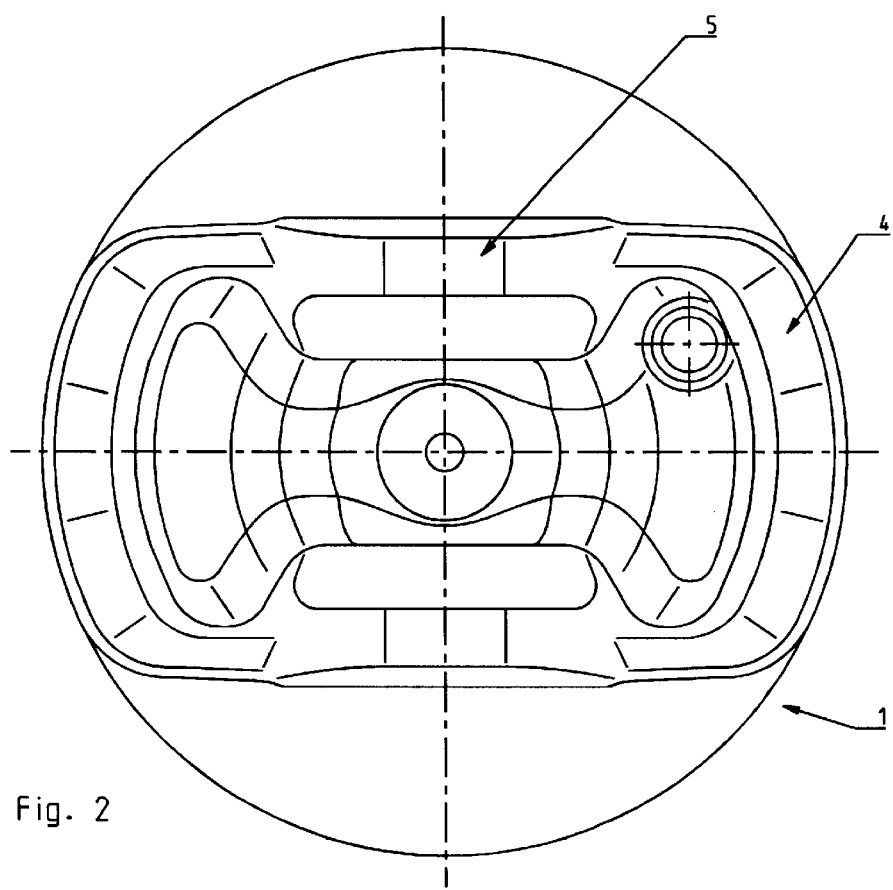
FIG. 2 shows a bottom view of the piston blank.

FIGS. 1 and 2 show a one-part piston blank 1 produced according to a known drop-forging process. The contour of the finished piston is indicated by dash-dotted lines. Piston blank 1 comprises a piston crown 2 with piston ring band 3 produced later, a piston skirt 4, and piston bosses 5 suspended on piston crown 2. The piston blank can be produced from a forgeable steel or Al-alloy.

Figure 3:
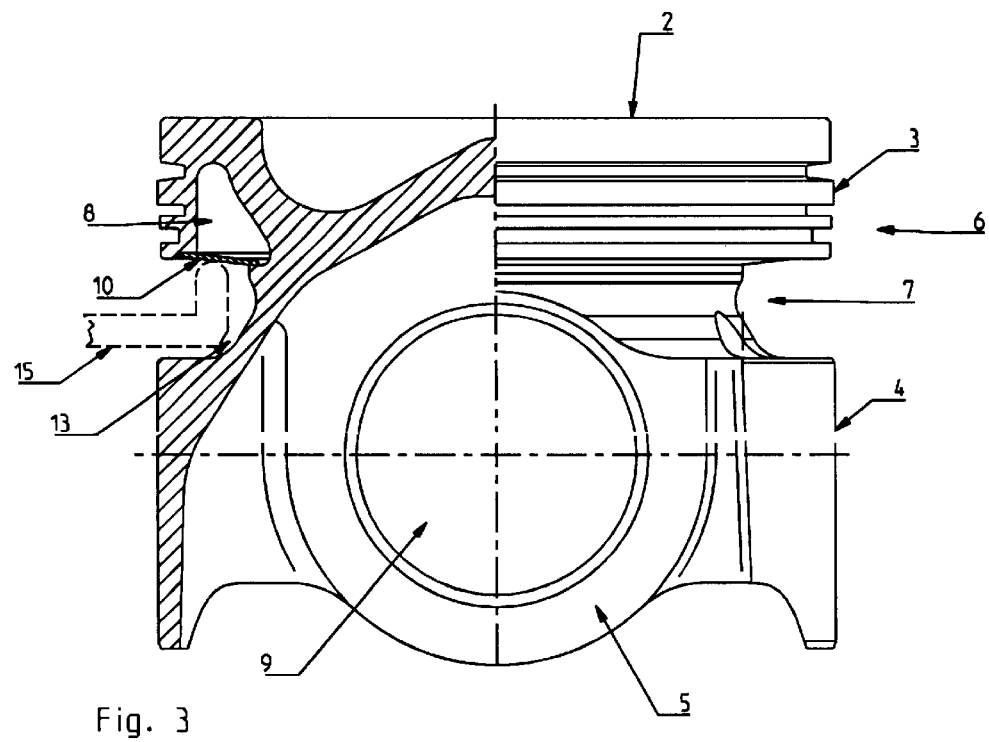
FIG. 3 shows a lateral, partly sectional view of the finished piston.
Figure 4:
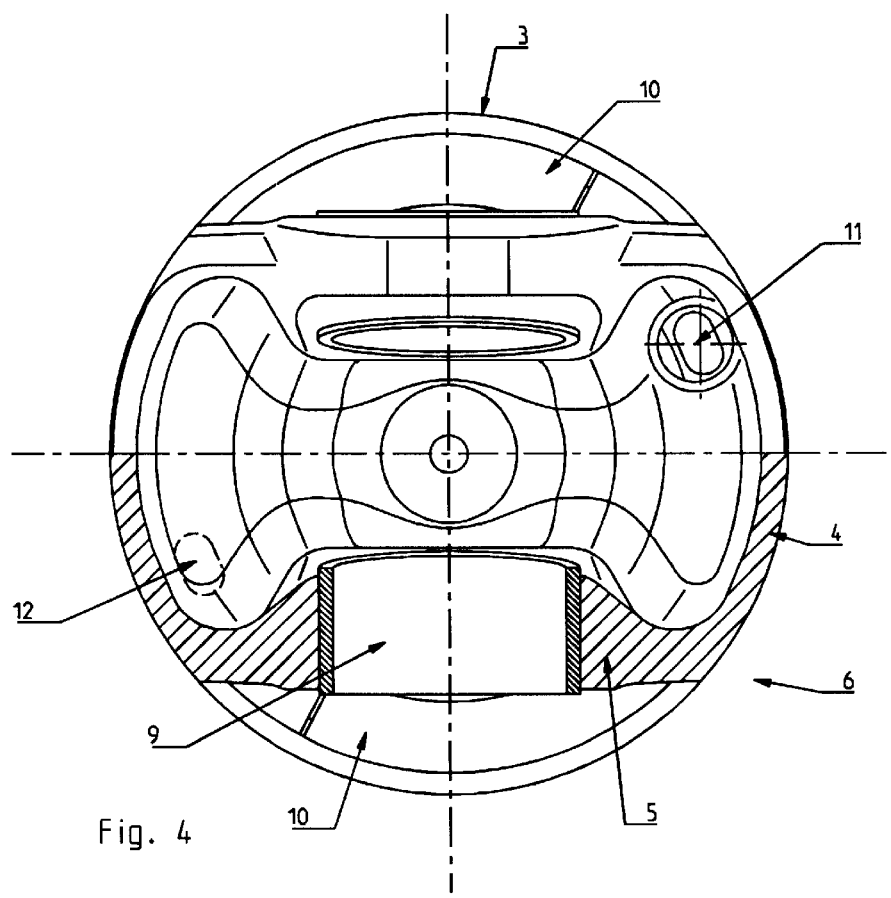
FIG. 4 shows a bottom, partly sectional view of the finished piston.

FIGS. 3 and 4 show the finished piston 6 produced by the method according to the invention. In a first process step, piston blank 1 is provided with an annular recess 7 by machining (turning), whereby its axial height is slightly greater than the height of the later cooling duct 8. However, piston crown 2 is not fully separated from piston skirt 4 and is still connected all around. This connection 13 can be either circumferential or strut-like, having breaks in the connection at certain points, although a circumferential connection is preferred.

For producing the downwardly open cooling duct 8, a hook-like turning tool 15 is inserted in recess 7 and cooling duct 8 is turned into the desired shape by setting the tool 15 axially and radially as required. Subsequently, boss bores 9 are produced in the known way and the outer contour of piston 6 is finished by machining.

For closing the downwardly open cooling duct 8, a cover ring 10 divided in two parts (e.g. a divided disk spring) is inserted with initial stress on piston crown 2 in matching supports. Cover ring 10 is provided with an inlet aperture 11 and an outlet aperture 12 for the cooling oil.

A one-part piston with a closed cooling duct is produced by this method at favorable cost, and has, for example greater strength as compared to pistons manufactured by a casting process, because the piston material can be selected freely, i.e., forged steel or forgeable Al-alloy, so that the piston is better suited for highly stressed Diesel engines.

Furthermore, machining the recess so that an upper end of the piston skirt remains connected to a radially inner region below the crown creates a stronger design and has correspondingly higher safety margins in highly stressed areas. Piston secondary motion is reduced because of the stiffer design, which results in less ring motion, which reduces wear and lessens oil requirements, and has a reduced risk of cavitation. In certain cases the stiffness of the skirt is sufficient to guide the piston only in the skirt section. Guidance in the ring band area could be eliminated, if desired.

The improved design makes the distribution of side load more even, contributing to less cylinder liner wear. Finally, the piston of the present invention is easier to machine. It allows for a turning operation with fewer interruptions, and requires no deburring action.

Accordingly, while only a few embodiments of the present invention have been shown and described, it is obvious that many changes and modifications may be made thereunto without departing from the spirit and scope of the invention.

What is claimed is:

1. Method of producing a one-piece piston for an engine from a piston blank by forging the piston blank, and subsequently machining an annular recess between a piston ring band and a box-shaped piston skirt, wherein the piston skirt is connected with piston bosses suspended on a piston crown, machining a downwardly open cooling duct annularly extending in the piston crown at a level of the piston ring band;

producing the boss bores and finishing the outer contour of the piston; and closing the downwardly open cooling duct with a cover ring;

wherein the annular recess is machined such that an upper end of the skirt remains connected to a radially inner region below the piston crown.

2. Method according to claim 1, wherein the axial height of the annular recess (7) at least conforms to the axial height of the cooling duct.

3. Method according to claim 1, wherein the cover ring (10) is divided in two parts.

4. Method according to claim 1, wherein the step of machining the cooling duct comprises inserting a turning tool into a recess in the cooling duct and setting the turning tool axially and radially to turn the cooling duct into a desired shape.

5. Method according to claim 1, wherein a forgeable, heat-resisting steel is used as the piston material.

6. Method according to claim 1, wherein a forgeable Al-alloy is used as the piston material.

7. Method according to claim 1, wherein the connection between the upper end of the skirt and the radially inner region below the crown is circumferential.

8. Method according to claim 1, wherein the connection between the upper end of the skirt and the radially inner region below the crown is in the form of a strut.

* * * * *